(12) United States Patent
Civelli

(10) Patent No.: US 9,162,623 B1
(45) Date of Patent: Oct. 20, 2015

(54) WIDE VIEW MIRROR FOR COMMERCIAL TRUCKS AND OTHER LARGE VEHICLES

(71) Applicant: Kenneth Civelli, Las Vegas, NV (US)

(72) Inventor: Kenneth Civelli, Las Vegas, NV (US)

( * ) Notice: Subject to any disclaimer, the term of this patent is extended or adjusted under 35 U.S.C. 154(b) by 459 days.

(21) Appl. No.: 13/629,454

(22) Filed: Sep. 27, 2012

(51) Int. Cl.
 *B60R 1/06* (2006.01)
(52) U.S. Cl.
 CPC .......................................... *B60R 1/06* (2013.01)
(58) Field of Classification Search
 CPC ............ B60R 1/025; B60R 1/02; B60R 1/07; B60N 2/0248; B60N 2/0244; B60N 2/0232
 See application file for complete search history.

(56) References Cited

U.S. PATENT DOCUMENTS

| 6,270,225 | B1* | 8/2001 | Goolsby | 359/866 |
| 6,932,483 | B2* | 8/2005 | Strumolo et al. | 359/864 |
| 2004/0212489 | A1* | 10/2004 | Chan | 340/475 |
| 2008/0239529 | A1* | 10/2008 | Kilic et al. | 359/850 |
| 2010/0315732 | A1* | 12/2010 | Henion et al. | 359/872 |

\* cited by examiner

*Primary Examiner* — Jennifer L. Doak
(74) *Attorney, Agent, or Firm* — MU Patents; Timothy Marc Shropshire

(57) ABSTRACT

A wide view mirror expands the field of view for drivers of commercial trucks and other large vehicles. The wide view mirror comprises a single piece of material formed into a planar surface immediately adjacent to an inner contoured surface and an outer contoured surface. The inner contoured surface is formed with a first arc having a first constant radius of curvature and a first width. The outer contoured surface is formed with a second arc having a second constant radius of curvature and a second width. The second radius is greater than the first radius; and the second width is greater than the first width creating an expanded field of view.

6 Claims, 3 Drawing Sheets

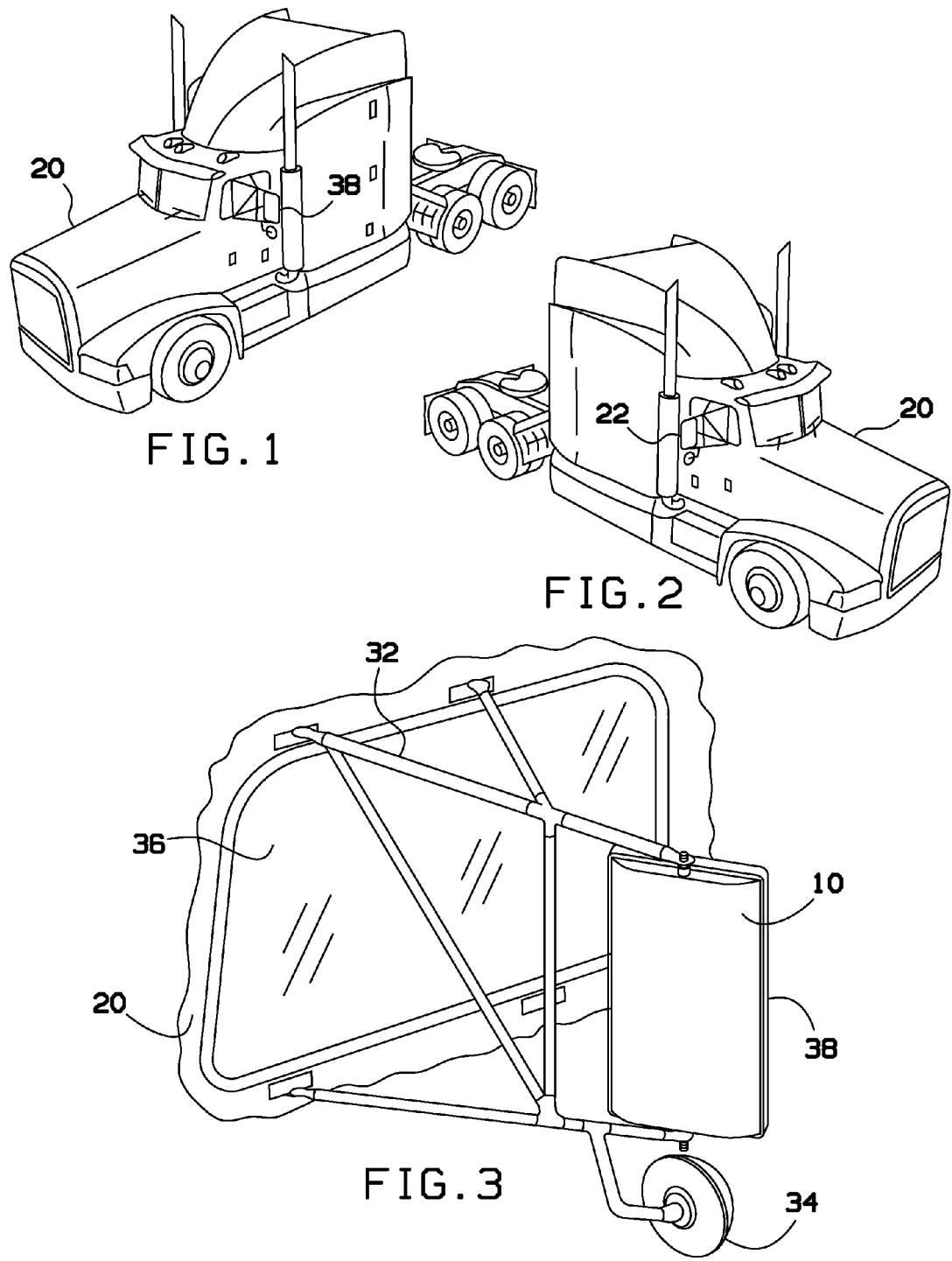

WIDE VIEW MIRROR FOR COMMERCIAL TRUCKS AND OTHER LARGE VEHICLES

FIELD OF THE INVENTION

This invention relates to automotive parts and accessories.

BACKGROUND OF THE INVENTION

A truck driver's direct field of view is significantly more restricted than that of other vehicles, especially passenger vehicles. The difficulties of seeing through mirrors for a commercial vehicle driver of semi-tractor trailers, delivery straight trucks, buses and personal recreational vehicle motor homes are well known and documented. Federal Motor Vehicle Safety Standard (FMVSS) 571.111 Rearview Mirrors (codified at 49 C.F.R. §571.111), sets standards and requirements for vehicles to improve safety and minimize blind spots for drivers in traffic. A typical flat or planar mirror has limited field of view. A convex or spherical mirror provides an increased field of view but the images in the convex or spherical mirror are distorted and minimized. Thus, estimation of both distance and relative closure speeds of traffic approaching the commercial vehicle from behind or alongside is more difficult.

Many trucks have at least six mirrors; each mirror has a different reflective optical quality. This increases the difficulty for the driver to quickly judge the dynamic traffic environment, which increases driver fatigue and the likelihood of a driver making an error.

These matters are well recognized in the extensive researches performed by the University of Michigan Transportation Research Institute for the Department of Transportation. These studies indicate a need for improvements in mirrors available to trucks and large vehicles to reduce side lane-change accidents by minimizing driver confusion and fatigue. This research includes: (1) Daniel Blower, Truck Mirrors, Field of View and Serious Truck Crashes, UMTRI-2007-25 (available at http://deepblue.lib.umich.edu/bitstream/2027.42/58728/1/99830.pdf); (2) Mathew P. Reed, Daniel Blower, Michael J. Flannagan, Prioritizing Improvements to Truck Driver Vision, UMTRI-2005-31 (available at http://deepblue.lib.umich.edu/bitstream/2027.42/83927/1/102737.pdf); (3) Luoma, J., Flannagan, M. J., and Sivak, M., Effects of Non-Planar Driver Side Mirrors on Lane Change Crashes, UMTRI-2006-26 (available at http://deepblue.lib.umich.edu/bitstream/2027.42/49417/1/UMTRI-2000-26.pdf); (4) Helmers, G., Flannagan M. J., Sivak, M., Owens, D. A., Battle, D., and Sato, T., Response Times Using Flat, Convex and Multi-Radius Mirrors, UMTRI-92-20 (available at: http://deepblue.lib.umich.edu/bitstream/2027.42/64070/1/82649.pdf); (5) Luoma, J. Sivak, M., Flannagan, M. J., Effects of Driver-Side Mirror Types on Lane-Change Accidents, UMTRI-94-34 (available at: http://deepblue.lib.umich.edu/bitstream/2027.42/1107/2/59932.0001.001.pdf); (6) Flannagan, M. J., Sivak, M., Schumann, J. Kojima, S., Traube, E. C., Distance Perception in Driver-Side and Passenger-Side Convex Rearview Mirrors: Objects in Mirror are More Complicated Than They Appear, UMTRI-97-32 (available at: http://deepblue.lib.umich.edu/bitstream/2027.42/49363/1/UMTRI-97-32.pdf); and (7) Sivak, M., Devonshire, J., Flannagan, M. J., Reed, M. P., Mirror Size and Lane-Change Crashes, UMTRI-2008-32 (available at: http://deepblue.lib.umich.edu/bitstream/2027.42/58738/1/100958.pdf), which are hereby incorporated by reference in their entirety.

The prior art contain many shortcomings that are resolved by the present invention. For example, the prior art mirrors have been developed for automobiles, except as noted below, and not the special requirements of trucks and other large vehicles. The prior art mirrors also do not provide a clear and true field of view since the prior art mirrors distort images in size and depth perception resulting in objects appearing further away and smaller than the objects actually are. This is because the prior art mirrors have used progressive multi-radius, spherical designs or a combination of these. The prior art mirrors have not been designed with both different sectional widths and different constant radius combinations in one mirror with a center planar section. All previous automotive designs are wider than taller.

U.S. Pat. No. 3,764,201 issued to Haile teaches a rear vision mirror. This is the only truck mirror prior art that considers adding more field of view for the driver, but does so in a way that includes convex surfaces to the top and bottom along with the outer edge of the planar surface. The adjoining areas of these additional convex surfaces would provide considerable distortion and it does not take advantage of rotating the planar mirror surface outward to provide the most beneficial clear viewing of the adjacent lane for the driver, as does the present invention.

U.S. Pat. No. 4,331,382 issued to Graff teaches a wide-angle mirror for use on automobiles. Graff clearly states that his design is exclusive of buses and trucks larger than pick-ups. It is also claiming a radius of 8 inches±12½% with one outboard mirror surface which has much too small a radius to provide any clarity for what is being seen.

U.S. Pat. No. 8,147,077 issued to Lynam teaches an exterior side view mirror for automobiles. Lynam is presenting the process of providing layers for reflective and protective surfaces, upon preformed backings consisting of polymeric flexible substrate reflective element construction to virtually any combination available for optic quality. Lynam discusses applying this process to curvatures in multi-radius designs erroneously includes spherical and aspherical curvatures which may be on either side in addition to a center planar reflective surface. Lyman teaches designing inboard curvatures of larger radii than outboard curvatures utilizing multi-radius design, which is opposite of the present invention.

BRIEF SUMMARY OF THE INVENTION

The present invention expands upon the need to improve traffic safety and minimize all types of crashes that large vehicles are involved in. There are large "blind spots" that still exist despite having so many different mirrors located around the vehicle.

The present invention design has been created with shape that has not yet been considered. The FMVSS requires a planar surface area of 323 $cm^2$, a user can maximize the use of the mirror by rotating this planar reflective surface outward to allow for a more complete direct vision of the adjacent lane. A wide view mirror expands the field of view for drivers of commercial trucks and other large vehicles. The wide view mirror comprises a single piece of material formed into a planar surface immediately adjacent to an inner contoured surface and an outer contoured surface. The inner contoured surface is formed with a first arc having a first constant radius of curvature and a first width; the outer contoured surface is formed with a second arc having a second constant radius of curvature and a second width. The second radius is greater than the first radius. The second width is greater than the first width creating an expanded field of view.

The result of such a configuration that has not been apparent to even those that are expert in the field is a greater field of view for the sides of large vehicles while still retaining exceptional clarity without the distortion effects of other mirror styles trying to accomplish the same result.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIG. 1 is a driver side perspective view of the invention shown in use.

FIG. 2 is a passenger side perspective view of the invention shown in use.

FIG. 3 is a detailed perspective view of the invention (typical both sides).

Figure 4:
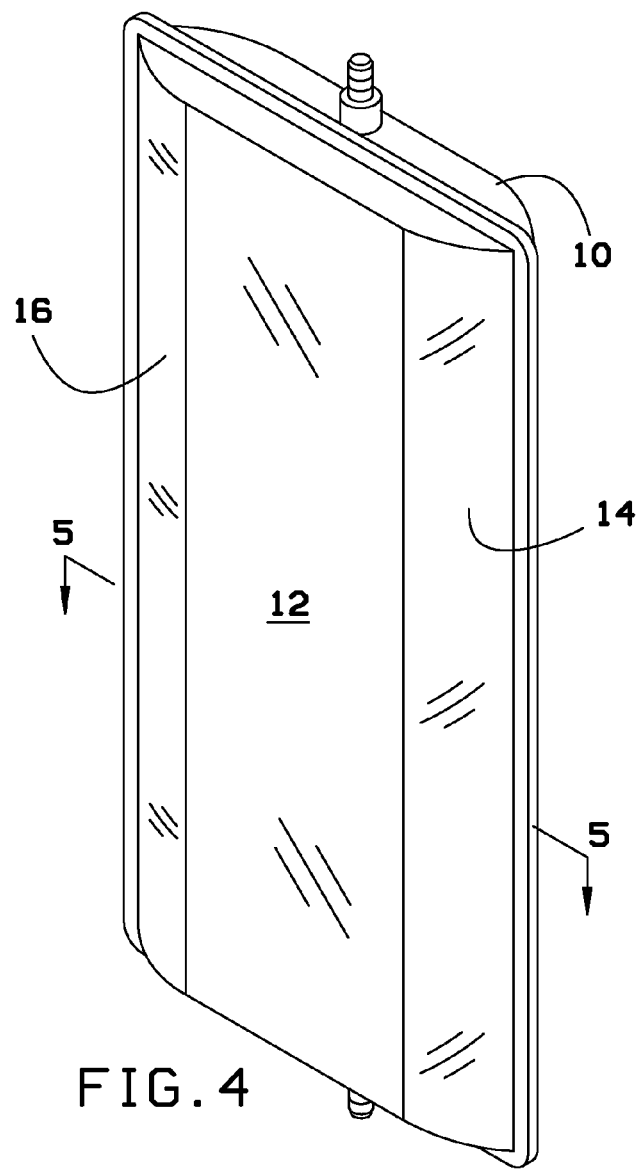

FIG. 4 is a detailed perspective view of the invention.

Figure 5:
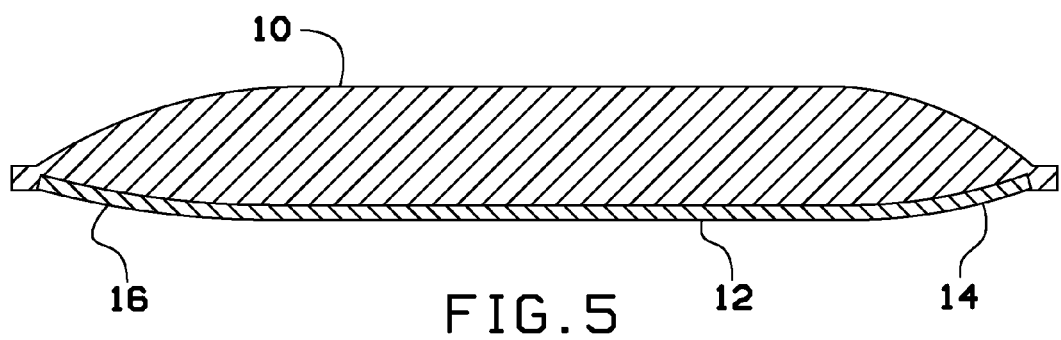

FIG. 5 is a section view of the invention taken along line 5-5 in FIG. 4.

Figure 6:
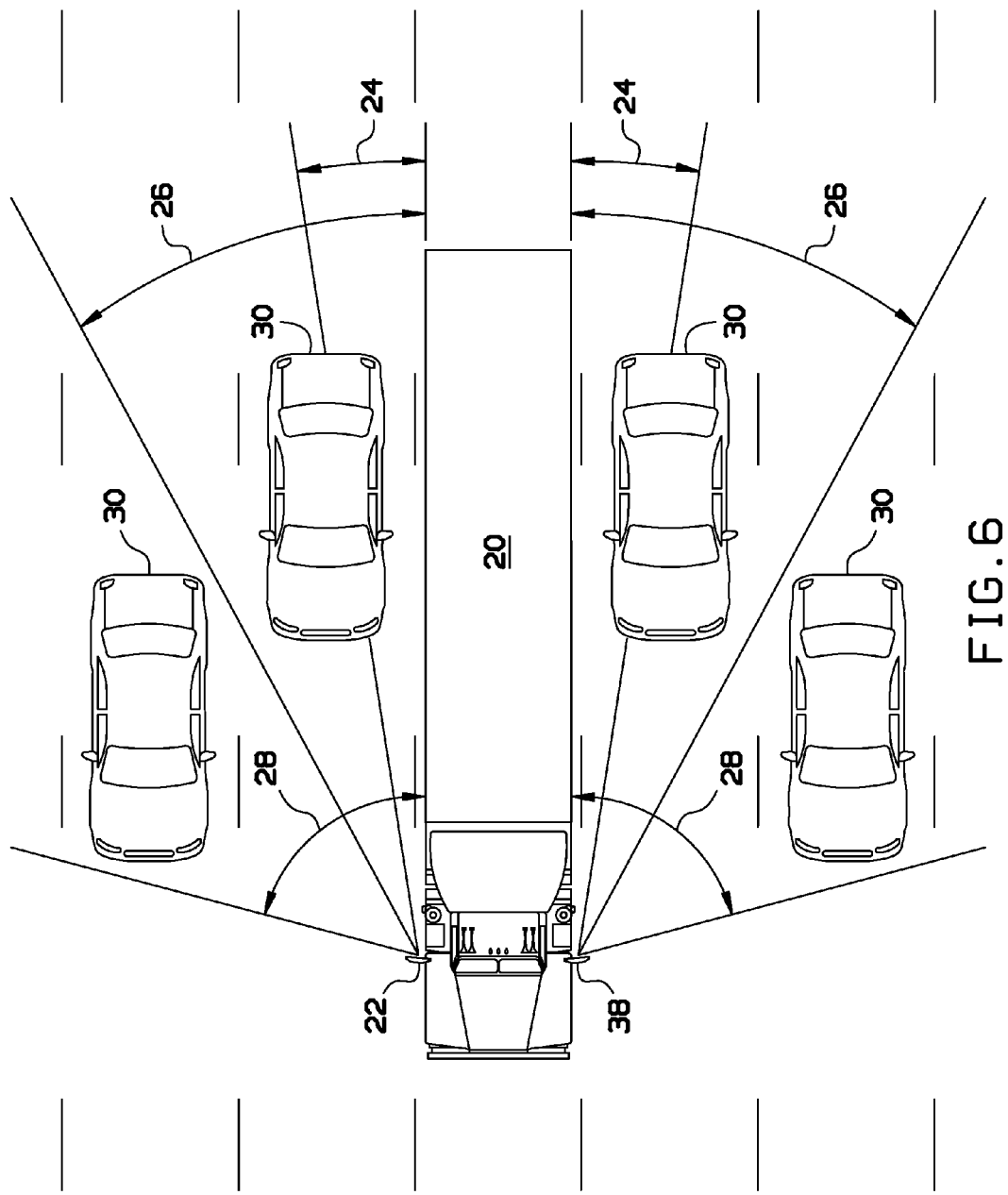

FIG. 6 is a schematic view of the invention shown in use.

DETAILED DESCRIPTION OF THE INVENTION

Embodiments of the present invention overcome many of the obstacles associated with blind zones in trucks, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 and FIG. 2 show the invention in use. A user desires to drive a large commercial vehicle such as truck 20 without creating undo risk to the user and others by having blind zones. As used here, a "field of view" represents an area that can be viewed by the driver of truck 20, a "blind zone" is area that cannot be viewed by the driver of truck 20. Truck 20 is mechanically coupled to driver side mirror 38 and passenger side mirror 22 as shown in more detail in FIG. 3.

FIG. 3 shows driver side mirror 38 in more detail. Passenger side mirror 22 is arranged in a mirror-image fashion. Truck 20 is mechanically coupled to window 36 in a manner well known in the art. Truck 20 is further mechanically coupled to mirror mounting bracket 32. Mirror mounting bracket 32 can be mechanically coupled to truck 20 in any known manner such as utilizing screws or welding. Mirror mounting bracket 32 may be attached proximate window 36, but mirror mounting bracket 32 should not cover window 36.

Mirror mounting bracket 32 is mechanically coupled to mirror housing 10 with two screws such that mirror housing 10 can rotate within mirror mounting bracket 32. Mirror mounting bracket 32 is further mechanically coupled to fixed convex side mirror 34. Mirror housing 10 is shown in more detail in FIG. 4.

FIG. 4 and FIG. 5 show mirror housing 10 in more detail. Mirror housing 10 comprises the wide view mirror, which has three continuous sections. Inner contoured surface 14 is immediately adjacent to planar surface 12. Planar surface 12 is further immediately adjacent to outer countered surface 16. While many dimensions can be used depending on the arrangement of truck 20, planar surface must be at least 323 cm$^2$ to comply with Federal Regulations in the United States. Inner contoured surface 14, planar surface 12 and outer contoured surface 16 are of a single piece of material being taller than wider. For example the wide view mirror can be 16 inches tall by 8 inches wide.

In this exemplary construction for a semi-tractor trailer, planar surface 12 may be 4.125 inches wide, inner contoured surface 14 may be 1.625 inches wide and outer contoured surface 16 may be 2.250 inches wide collectively the mirror has an "overall width." The differences in surface contours between inner contoured surface 14, planar surface 12 and outer contoured surface 16 are vertical in nature. Inner contoured surface 14 and outer contoured surface 16 are flush with planar surface 12 and contour toward forward of vehicle 20. The wide view mirror is a single piece constructed reflective surface that can be assembled in any universal enclosure such as mirror enclosure 10. In this manner for semi-tractor trailers, planar surface 12 is at least 52% of overall width; inner contoured surface 14 is no more than 20% of overall width and a 15 inch radius. Outer contoured surface 16 is no more than 28% of overall width with an 18 inch radius. This construction provides an optimum range to view surrounding traffic for a semi-tractor trailer driver. However, the device can operate if these values are within 20% of the values listed above. The following shows an optimal field of view for most trucks, buses and recreational motor homes:

| Surface | Preferred width (%) | Low width (%) | High width (%) | Preferred radius (in) | Low radius (in) | High radius (in) |
| --- | --- | --- | --- | --- | --- | --- |
| Planar surface 12 | 52.0 | 41.6 | 69.6 | n/a | n/a | n/a |
| Inner contoured surface 14 | 20.0 | 16.0 | 24.0 | 15.0 | 12.0 | 18.0 |
| Outer contoured surface 16 | 28.0 | 22.4 | 33.6 | 18.0 | 14.4 | 21.6 |

To make the wide view mirror, a user can use either a single piece of material, such as stainless steel polished to a #8 super mirror finish or a ½ inch tempered glass ("the glass") and then form inner contoured surface 14 with a first arc having a first radius and a first width. Next the user forms outer contoured surface 16 with a second arc that having a second radius and a second width. This leaves planar surface 12 with a third width. As used in this application, a "constant radius of curvature" occurs when an arc has a single constant radius value throughout the length of the arc. In the preferred embodiment, the first radius as a first constant radius of curvature and the second radius has a second constant radius of curvature. The present invention also teaches an "unbent other than horizontally" constant radius of curvature, this occurs when the mirror is only curved around parallel axis and is not bent in a semi-spherical manner on the top and bottom of the mirror. The latter is common in the prior art, but actually leads to image distortion. The present invention teaches that having the second radius greater than the first radius, and the second width greater than the first width increases the field of view as shown in FIG. 6. The glass would have a coating applied to an interior surface in order to create an interior offering mirror imaging. The single piece of reflective surface described is the wide view mirror. Once completed the wide view mirror can be mechanically coupled to mirror housing 10 in a known manner or created as a single unit depending on user preference.

When mirror housing 10 is the universal mirror enclosure well known in the commercial vehicle field, the wide view mirror can fit within mirror enclosure 10. Using universal enclosures allows for additional features besides mounting to an acceptable current standard, like heated for winter or high moisture environments, to add lights or reflectors to the backside of the wide view mirror assembly, even having the unit being fully adjustable via internal electric motors. A major enhancement of critical importance that can be added is the ability to tint lights to acceptable levels preventing the night glare of approaching vehicles from the rear.

FIG. 6 shows the affect of the stated construction using a figure similar to that in Blower. Truck 20 is mechanically coupled to driver side mirror 38 and passenger side mirror 22. A flat mirror that meets the standards in the Federal Regulations will have field of view 24. The standard mirror and fixed convex mirror side mirror 34 field of view 26 with a distorted vision as noted above. The disclosed invention allows for the wide view mirror and fixed convex side mirror 34 field of view 28. The difference in the arc between field of view 28 and field of view 26 is an expanded field of view which is an improvement over the prior art.

I claim:

1. A wide view mirror for motor vehicles that expands a driver's field of view, the wide view mirror comprising:
    a single only piece of reflective surface material having a planar surface portion between and immediately adjacent to an inner contoured surface and an outer contoured surface, wherein the inner and outer contoured surfaces extend from opposite ends of the planar surface, wherein the inner contoured surface is formed with a first arc having a first constant radius of curvature and a first width, and the outer contoured surface is formed with a second arc having a second constant radius of curvature and a second width, wherein the second radius is greater than the first radius, and the second width is greater than the first width, creating an expanded field of view.

2. The wide view mirror of claim 1, wherein the inner and outer contoured surfaces are curved along a vertical axis.

3. The wide view mirror of claim 1, wherein the inner and outer contoured surfaces are unbent other than horizontally.

4. The wide view mirror of claim 1, wherein the mirror is configured to be retrofitted to a universal mirror enclosure.

5. The wide view mirror of claim 1, wherein the single piece of material has an overall width, wherein the planar surface is at least 41.6% of the overall width but no more than 69.6% of the overall width, and wherein the inner contoured surface is at least 16.0% of the overall width but no more than 24.0% of the overall width, wherein the first radius of curvature is at least 12 inches but no more than 18 inches, and wherein the outer contoured surface is at least 22.4% of the overall width but no more than 33.6% of the overall width, wherein the second radius of curvature is at least 14.4 inches but no more than 21.6 inches.

6. The wide view mirror of claim 1, wherein the single piece of material has an overall width, wherein the planar surface is at least 52% of the overall width, and wherein the inner contoured surface is no more than 20.0% of the overall width, wherein the first radius is at least 15 inches, and wherein the outer contoured surface is at least 28% of the overall width, wherein the second radius is at least 18 inches.

* * * * *